US006599565B1

United States Patent
Umai et al.

(10) Patent No.: US 6,599,565 B1
(45) Date of Patent: Jul. 29, 2003

(54) BITTERN-CONTAINING COMMON SALT GRAINS AND PROCESS FOR PREPARING THE SAME

(75) Inventors: Masaru Umai, Naruto (JP); Tadaharu Watanabe, Tokushima (JP)

(73) Assignee: Umai Co., Ltd., Tokushima-Ken (JP)

( * ) Notice: Subject to any disclaimer, the term of this patent is extended or adjusted under 35 U.S.C. 154(b) by 15 days.

(21) Appl. No.: 09/665,126

(22) Filed: Sep. 20, 2000

(30) Foreign Application Priority Data

Sep. 20, 1999 (JP) ............................................. 11-266352

(51) Int. Cl.⁷ .............................. A23L 1/22; B01J 2/00; C01D 3/06; C01D 3/22
(52) U.S. Cl. ........................ 427/189; 427/180; 427/201; 427/212; 427/215; 423/499.1; 423/499.4
(58) Field of Search .................................. 427/180, 189, 427/201, 212, 215; 423/499.1, 499.4

(56) References Cited

U.S. PATENT DOCUMENTS

| 4,536,418 A | * | 8/1985 | Goldsmith | ................... 427/213 |
| 4,556,566 A | * | 12/1985 | Bell | ........................... 426/302 |
| 4,734,290 A | * | 3/1988 | Meyer | ......................... 426/302 |
| 5,094,862 A | * | 3/1992 | Bunick et al. | ............... 426/538 |

FOREIGN PATENT DOCUMENTS

| JP | 54-25105 | 8/1979 |
| JP | 55-16625 | 5/1980 |
| JP | 1-181762 | 7/1989 |
| JP | 3-242318 A | 10/1991 |

OTHER PUBLICATIONS

Patent Abstracts of Japan, abstracting JP–A–3–242318, Oct. 29, 1991.

* cited by examiner

Primary Examiner—Ngoc-Yen Nguyen
(74) Attorney, Agent, or Firm—Sughrue Mion, PLLC

(57) ABSTRACT

The invention provides a common salt having the rounded-off savory taste of natural common salt and yet a reduced tendency toward deliquescence and coagulation and a process for producing the same. The invention further provides a method for fractional recovery of freshwater and raw materials for the above common salt from seawater in connection with the production of the same common salt. The common salt of the invention is a bittern-containing granular common salt with each of its grains consisting of a core comprised of a bittern-containing composition optionally containing NaCl and, as covering the grain, a coating layer comprised of a NaCl-containing composition optionally containing $CaSO_4$ or bittern. The method for fractional recovery of freshwater and raw materials for the above common salt from seawater according to the invention comprises a step of treating seawater with a reverse osmosis membrane to fractionate it into freshwater and a salt-containing water and subjecting the salt-containing water to an ion exchange treatment to fractionate it into a NaCl-containing composition and a bittern-containing composition or a step of subjecting seawater to an ion exchange treatment to fractionate it into an aqueous NaCl-containing solution and an aqueous bittern-containing solution and subjecting each of the aqueous NaCl-containing solution and aqueous bittern-containing solution to a reverse osmosis membrane treatment to fractionate it into freshwater and either a NaCl-containing composition or a bittern-containing composition.

6 Claims, 6 Drawing Sheets

BITTERN-CONTAINING COMMON SALT GRAINS AND PROCESS FOR PREPARING THE SAME

TECHNICAL FIELD

The present invention relates to a common salt having the rounded-off savory taste of natural common salt and a reduced tendency toward deliquescence and coagulation. More particularly, the present invention relates to a common salt which has an improved mouth-feel realized by inclusion of the mineral fraction of seawater and is free from the objectionable tendency toward deliquescence and coagulation. The present invention further relates to a method of producing said common salt and a production apparatus for reducing the method to practice.

Furthermore, the present invention relates to a method for effective utilization of seawater in the production of said common salt. More particularly, the invention relates to a process for fractitonally recovering a raw material or materials for said common salt from the freshwater fraction of seawater and producing said common salt from said raw material or materials.

BACKGROUND ART

The unrefined common salt available from seawater contains seawater minerals (bittern), inclusive of magnesium chloride, and has a pleasing salty taste which cannot be obtained with refined common salt. However, since bittern has the property to absorb moisture from the atmosphere and undergoes deliquescence, the unrefined common salt is hygroscopic due to the deliquescent property of the bittern and undergoes coagulation with time (coagulability) with the consequent disadvantage of a short shelf-life and difficulties in handling.

To overcome the above disadvantages, a common salt highly purified by removing bittern by an ion exchange technique and containing NaCl in a high concentration (not less than 99.4%) has heretofore been used as the table common salt. As produced by the above procedure, the table common salt has no deliquescent property and is easy to handle but has the shortcoming that it lacks the inherent savory salty taste of the bittern.

Under the circumstances, a variety of processed salts overcoming the hygroscopicity and other drawbacks of common salt have been proposed. JP 55(1980)-16625, B for instance, discloses a processed salt with said hygroscopicity reduced by depositing a sodium or potassium salt of organic acid on the surface of common salt crystals. JP 54(1979)-25105, B discloses a processed salt prepared by coating common salt crystals with a minor amount of a stevia extract to thereby augment the characteristic pleasing taste and reduce the hygroscopicity of common salt. Furthermore, JP 1(1989)-181762, A discloses a processed salt comprising a core comprised of a seasoning or flavor material hermetically enshrouded with a crystalline salt coating. In the processed salt disclosed in JP Kokai H1-181762, the salty taste has been supplemented with a savory taste derived from the seasoning material used as the core.

DISCLOSURE OF INVENTION

The present invention has for its object to overcome the drawbacks of the prior art relating to common salt and thereby provide a common salt which is tasteful and easy to handle and a method for its production.

More particularly, the first object of the present invention is to provide a common salt which has the savory, salty taste characteristic of natural salt retained through inclusion of the mineral component of seawater and reduced in the tendency toward deliquescence and coagulation, hence having been improved in storage stability and ease of handling. The second object of the invention is to provide a method of producing said common salt and an apparatus suitable for practicing said method.

Thirdly, it is also an object of the invention to implement an effective utilization of seawater in the production of common salt by recovering a raw material for said common salt from seawater efficiently and without involving a waste of the seawater and insure an effective utilization of the byproduct freshwater. Stated differently, the invention further provides a method for effective utilization of seawater.

The inventors of the present invention made an intensive research with an aim at improving the taste and inhibit deliquescence of common salt and found that when a bittern-containing composition rich in bittern is used as a core and the surface of this core is covered with sodium chloride or a sodium chloride-containing composition optionally containing calcium sulfate or bittern, the proportion of said bittern being smaller than that of the core composition, not only the tendency toward deliquescence can be significantly inhibited but a common salt having a savory taste characteristic of natural salt can be produced.

The present invention has been developed on the basis of the above finding.

The present invention, therefore, is directed to the common salts defined in the following paragraphs (1)~(4).

(1) A bittern-containing granular common salt characterized in that each grain thereof comprises a core comprised of a bittern-containing composition optionally containing sodium chloride and, as covering the surface of said core, a coating layer comprised of a sodium chloride-containing composition optionally containing calcium sulfate.

(2) A bittern-containing granular common salt as defined in (1) above further characterized in that the coating layer is comprised of a composition containing bittern and sodium chloride and that the proportion of bittern formulated in said coating layer is smaller than the proportion of bittern formulated in the bittern-containing composition of which the core is comprised.

(3) A bittern-containing granular common salt as defined in (1) or (2) further characterized in that the proportion of bittern formulated in the bittern-containing composition of which the core is comprised is 15~90 weight % per 100 weight % of the core.

(4) A bittern-containing granular common salt as defined in (2) or (3) further characterized in that the proportion of bittern formulated in the coating layer is not more than 10 weight %, preferably not more than 5 weight %, per 100 weight parts of the coating layer.

The present invention is further directed to the following methods (5)~(8) for producing said common salts:

(5) A method of producing the bittern-containing granular common salt defined in (1) which comprises spraying the surface of said core grain comprised of a bittern-containing composition optionally containing sodium chloride with an aqueous solution of sodium chloride optionally containing calcium sulfate and drying the same to coat said core grain with a sodium chloride-containing composition optionally containing calcium sulfate.

(6) A method of producing the bittern-containing granular common salt defined in (3) or (4) which comprises spraying the surface of said core comprised of a bittern-containing composition optionally containing sodium chlorlde with an aqueous solution of sodium chloride containing a smaller proportion of bittern than the bittern content of said core grain and drying the same to coat said core grain with a composition containing both bittern and sodium chloride.

(7) A method of producing the bittern-containing granular common salt defined in (1) which comprises feeding core grains comprised of a bittern-containing composition optionally containing sodium chloride and coating grains comprised of a sodium chloride-containing composition optionally containing calcium sulfate to a spray dryer and spraying those grains with a binder to cause said coating grains to be deposited on the surface of each of said core grains to form a coating layer.

(8) A method of producing the bittern-containing granular common salt defined in any of (2) through (4) which comprises feeding core grains comprised of a bittern-containing composition optionally containing sodium chloride and coating grains comprised of a composition containing sodium chloride and bittern, the proportion of the bittern being smaller than the bittern content of said core grains to a spray dryer and spraying those grains with a binder to cause the coating grains to be deposited on the surface of each core grain to form a coating layer.

The present invention is further directed to apparatuses (9)~(11) for production of the above common salts.

(9) A spray dryer comprising a casing equipped with an air supply port, an exhaust port and a discharge port for withdrawing product bittern-containing common salt grains, a feeder for feeding core grains comprised of a bittern-containing composition optionally containing sodium chloride into said casing, a nozzle for spraying an aqueous sodium chloride solution optionally containing calcium sulfate or bittern against the feed core grains, a spray solution supplier for feeding said aqueous sodium chloride solution to said nozzle, an air feeder for supplying drying air into the casing, and a discharger for discharging the product bittern-containing common salt grains into the outside of the casing.

(10) A spray dryer characterized by its comprising a casing equipped with an air supply port, an exhaust port and a discharge port for withdrawing product bittern-containing common salt grains, a feeder for feeding core grains comprised of a bittern-containing composition optionally containing sodium chloride and coating grains comprised of a sodium-chloride containing composition optionally containing calcium sulfate or bittern into the casing, a nozzle for spraying a binder against the feed core grains and coating grains, a spray solution supplier for feeding said binder to said nozzle, an air feeder for supplying drying air into the casing, and a discharger for discharging the product bittern-containing common salt grains into the outside of the casing.

(11) A spray dryer comprising a casing equipped with an air supply port, an exhaust port and a discharge port for withdrawing product bittern-containing common salt grains, a nozzle for spraying an aqueous solution of a bittern-containing composition optionally containing sodium chloride into said casing, a spray solution supplier for feeding said aqueous bittern-containing composition solution to said nozzle, a nozzle for spraying an aqueous sodium chloride-containing solution optionally containing calcium sulfate or bittern into said casing, a spray solution supplier for feeding said aqueous sodium chloride-containing solution to the nozzle mentioned just above, an air feeder for supplying drying air into the casing, and a discharger for discharging the product bittern-containing common salt grains.

The present invention is further directed to the following methods (12) and (13) for separating and recovering freshwater, a sodium chloride-containing composition and a bittern-containing composition efficiently from seawater.

(12) A method for fractional recovery of freshwater, a sodium chloride-containing composition and a bittern-containing composition from seawater comprising either a step of subjecting seawater to a reverse osmosis membrane treatment to fractionate it into freshwater and a salt-containing water and subjecting the salt-containing water to an ion exchange treatment to fractionate it into a sodium chloride-containing composition and a bittern-containing composition or a step of subjecting seawater to an ion exchange treatment to fractionate it into an aqueous sodium chloride-containing solution and an aqueous bittern-containing solution, and subjecting the aqueous sodium chloride-containing solution and aqueous bittern-containing solution respectively to a reverse osmosis membrane treatment to fractionate it into freshwater and a sodium chloride-containing composition or a bittern-containing composition.

(13) A method for fractional recovery of freshwater, a sodium chloride-containing composition and a bittern-containing composition from seawater comprising a step of subjecting seawater to a reverse osmosis membrane treatment to fractionate it into freshwater and a salt-containing water, a step of subjecting the salt-containing water obtained in the above step to an ion exchange treatment to fractionate it into a sodium chloride-containing composition and a bittern-containing composition, and a step of subjecting the sodium chloride-containing composition or bittern-containing composition obtained in the above step further to a reverse osmosis membrane treatment to fractionate it into freshwater and either a sodium chloride-containing composition or a bittern-containing composition.

Stated differently, the above methods for fractional recovery is a method for producing freshwater, a sodium chlorlde-containing composition and a bittern-containing composition using seawater as the raw material. Therefore, the present invention encompasses the freshwater, sodium chloride-containing composition and bittern-containing composition obtainable by the above production method.

The present invention is further directed to the following common salt produced from said seawater-derived sodium chloride-containing composition and bittern-containing composition and to the following method of producing the common salt.

(14) A bittern-containing granular common salt as defined in any of the above paragraphs (1)~(4) as prepared by using the sodium chlorlde-containing composition and bittern-containing composition obtainable by the above method (12) or (13) as the sodium chloride-containing composition optionally containing calcium sulfate or bittern, and the bittern-containing composition optionally containing sodium chloride, respectively.

(15) A method of producing a bittern-containing granular common salt as defined in any of the above paragraphs (5) through (8) characterized in that bittern-containing common salt grains are produced by a spray drying technique using the sodium chloride-containing composition and bittern-containing composition obtainable by the above method (12) or (13) as the sodium chloride-containing composition optionally containing calcium sulfate or bittern and the bittern-containing composition optionally containing sodium chloride, respectively.

The legends used on FIGS. 3~6 have the following meanings; 3: a spray dryer, 4: a casing, a: an air supply port, b: an exhaust port, c: a discharge port, 5: a feeder, 6: a nozzle, 7: a spray solution supplier, 7a: a pressure feeder, 7b: a spray solution reservoir, 8: an air supplier, 9: a discharger, 10: a cyclone, 11: a porous plate, 12: a rotary feeder, 13: a bag filter, 14: a nozzle, 15: a spray solution supplier, 15a: a pressure feeder, 15b: a spray solution reservoir.

Figure 7:
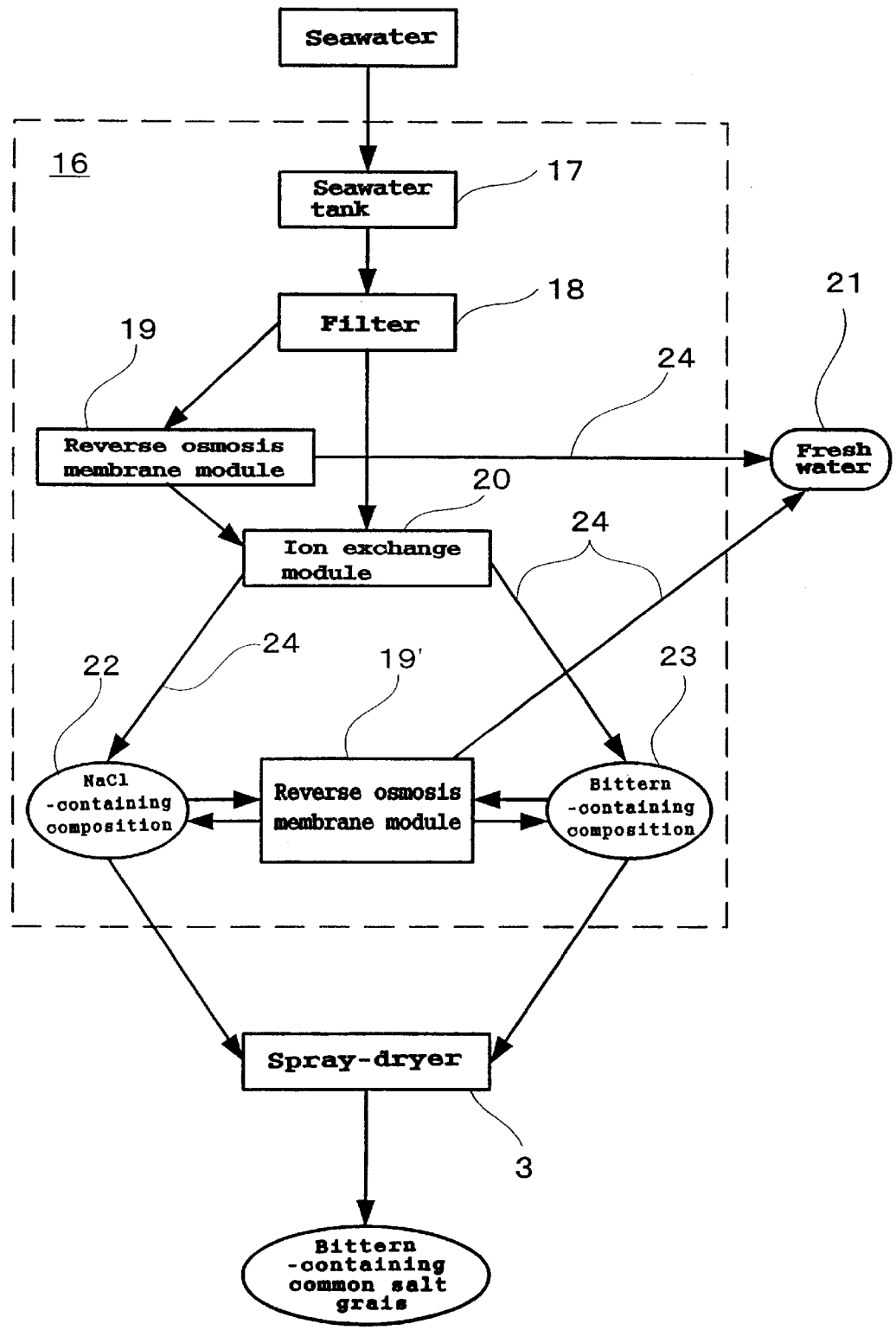

FIG. 7 is a schematic view showing a system for fractional recovery of freshwater, a sodium chlorlde-containing composition and a bittern-containing composition from seawater. The legends used on FIG. 7 have the following meanings; 16: a fractional recovery device, 17: a seawater tank, 18: a filter, 19, 19': a reverse osmosis membrane module, 20: an ton exchange module, 21: a freshwater recovery section, 22: a NaCl-containing composition recovery section, 23: a bittern-containing composition recovery section, and 24: a pipeline.

Figure 1:
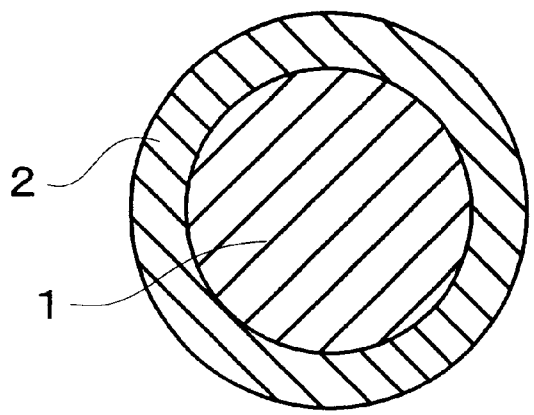
FIG. 1 is a sectional view showing a bittern-containing common salt grain embodying the principles of the invention. The reference numeral 1 represents a core (core grain) and the reference numeral 2 represents a coating layer.
Figure 2:
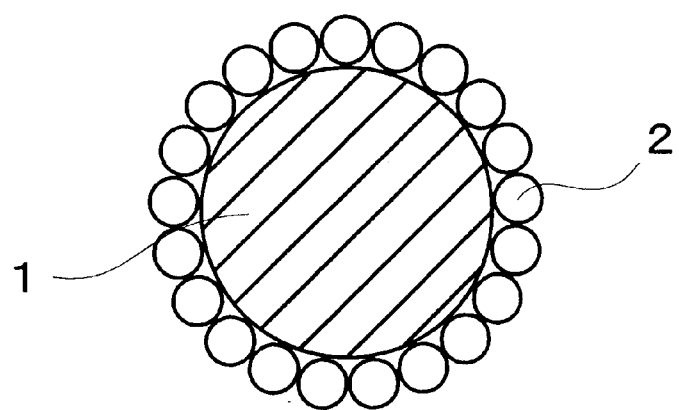
FIG. 2 is a sectional view showing another bittern-containing common salt grain embodying the principles of the invention. The reference numeral 1 represents a core (core grain) and the reference numeral 2 represents a coating layer (coating grains).

BEST MODE FOR CARRYING OUT THE INVENTION (1) Bittern-containing Common Salt Grains The bittern-containing common salt grain of the present invention is characterized in that, as illustrated in FIG. 1 or 2, it has a two-component structure consisting of a core 1 and a coating layer covering the surface of said core 1. More particularly, the bittern-containing common salt grain of invention is characterized by its consisting of a core grain comprised of a bittern-containing composition optionally containing sodium chloride (NaCl) and, as covering the surface thereof, a coating layer comprised of either sodium chloride (NaCl) or a composition containing at least calcium sulfate (CaSO$_4$) and sodium chloride (NaCl). This bittern-containing common salt grain may be in whichever of the form consisting of a core grain 1 covered with a coating layer 2 as illustrated in FIG. 1 and the form consisting of a core grain 1 covered with a granular coating layer (coating grains) 2 as illustrated in FIG. 2.

The term "bittern" as used in this specification means the mineral fraction of seawater. More particularly, there can be mentioned the product available on removal of NaCl from seawater and subsequent concentration of the residual water containing a variety of minerals or the product available on such concentration and subsequent optional purification. Such bittern contains at least magnesium chloride, magnesium sulfate, potassium chloride and calcium sulfate.

The bittern-containing composition constituting the core of the bittern-containing common salt grain of the invention may be a composition consisting solely in said bittern or a composition containing NaCl in addition to said bittern. The relative amounts of various components of the bittern are not particularly restricted but are preferably more or less reflecting the ratio of bittern substances occurring in seawater (seawater minerals). It Is known that in addition to sodium chloride, seawater contains magnesium chloride, magnesium sulfate, calcium sulfate and potassium chloride approximately in the ratio (weight ratio) indicated In Table 1.

TABLE 1

| NaCl | 77.9% |
|---|---|
| MgCl$_2$ | 9.6% |
| MgSO$_4$ | 6.1% |
| CaSO$_4$ | 4.0% |
| KCl | 2.1% |
| Others | 0.3% |

Though not critical, therefore, magnesium chloride, magnesium sulfate, calcium sulfate and potassium chloride in the bittern-containing composition should account for 35~55 weight parts, 15~35 weight parts, 10~30 weight parts, and 0.1~20 weight parts, respectively, based on 100 weight % of the bittern-containing composition.

The bittern-containing composition may be a composition composed 100% of said bittern or a composition containing other Ingredients in addition to said bittern. Though not critical, the bittern content of the core composition may for example be 15~95 weight %, preferably 15~90 weight %, more preferably 30~90 weight %, based on 100 weight % of the composition.

Among said other ingredients, there can be NaCl, as a preferred example. The proportion of NaCl contained per 100 weight % of the core composition is not particularly restricted insofar as the bittern content of the core composition falls within the above-mentioned range. Thus, NaCl may account for usually 5~85 weight %, preferably 10~85 weight %, more preferably 10~70 weight %.

In addition to the seawater-derived bittern fraction or NaCl, said bittern-containing composition may be optionally supplemented with an adulterant or volume builder such as calcium sulfate.

The coating layer to be formed over the surface of said core (core grain) is preferably comprised of a sparingly hygroscopic material capable of significantly inhibiting the deliquescence of the bittern contained in the core and, as such, may for example be comprised of NaCl or a composition containing CaSO$_4$ and NaCl. The proportion of CaSO$_4$ in the composition mentioned just above is not particularly restricted but is preferably not more than 10 weight %, more preferably not more than 5 weight %, per 100 weight % of the coating layer. The lower limit of formulation of CaSO$_4$ is not particularly restricted inasmuch as it is more than 0. However, CaSO$_4$ is preferably formulated in a proportion of not less than 0.01 weight %.

As a component of the coating layer, bittern may be used in lieu of said CaSO$_4$. In this case, the bittern is used in a smaller proportion as compared with the bittern content of said core grain (bittern-containing composition). Thus, per 100 weight % of the coating layer, bittern is used In a proportion of preferably not more than 10 weight %, more preferably not more than 5 weight %. The lower limit of formulation of bittern is not particularly restricted inasmuch as it is more than 0 but bittern is preferably formulated in a proportion of not less than 0.01 weight %. By covering said core grain with a coating composition containing NaCl and bittern in the above proportions, a savory common salt (grain) can be produced while the tendency toward deliquescence due to bittern to inhibited. The above composition for constituting the coating layer may be optionally supplemented with such adulterants or volume builders as calcium sulfate, magnesium carbonate, calcium carbonate, magnesium oxide and/or the like.

The preferred form of the bittern-containing common salt grain of the invention is one which, as described above, consists of a core comprised of a bittern-containing composition optionally containing NaCl and, as covering the surface of the core, a coating layer comprised of a NaCl-containing composition additionally containing bittern in a proportion smaller than the bittern content of said bittern-containing composition of which the core is comprised. The particularly preferred form of the common salt grain according to the invention has a two- or multilayer structure consisting of said core (core grain) and a coating layer and the composition of which, as a whole, is that of seawater.

In this manner, the common salt grain of the present invention may have a mellow, pleasing salty taste free of the pungency of salt because of the balance of minerals approximating that of seawater. Furthermore, the common salt grain of the invention has been significantly reduced in the tendency toward deliquescence and associated coagulation due to bittern so that it is very satisfactory in storage stability and ease of handling.

(2) Method and Apparatus for the Production of Bittern-containing Common Salt Grains The bittern-containing common salt grains of the present Invention can be produced by the spray drying technique. The present invention, therefore, provides a method for producing said bittern-containing common salt grains by the spray drying technique. This method includes a method in which a bittern-containing composition for constituting the core is first prepared in the form of solid grains and a composition for constituting the coating layer in the form of a solution is spray-dried on the surface of the core grain by the spray drying technique, a method in which both a bittern-containing composition for constituting the core and a composition for constituting the coating layer are provided each in form of solid grains or particles (core grains or particles and coating grains or particles) and causing the coating particles to be deposited on the surface of the core grain with the aid of a binder by means of a spray dryer, and a method in which both the core composition and the coating composition are fed each in the form of a solution to a spray dryer in such a manner that the coating composition in the form of a solution is sprayed against the surface of the core grain formed in situ in the spray dryer to form a coating layer.

The above production method and the apparatus for reducing the method to practice are now described in detail, reference being had to the accompanying drawings. It should be understood that the several views presented are merely illustrative of the method or apparatus for producing the bittern-containing common salt grains in accordance with the technical concept of the present invention and are by no means defining the scope of the invention.

Figure 3:
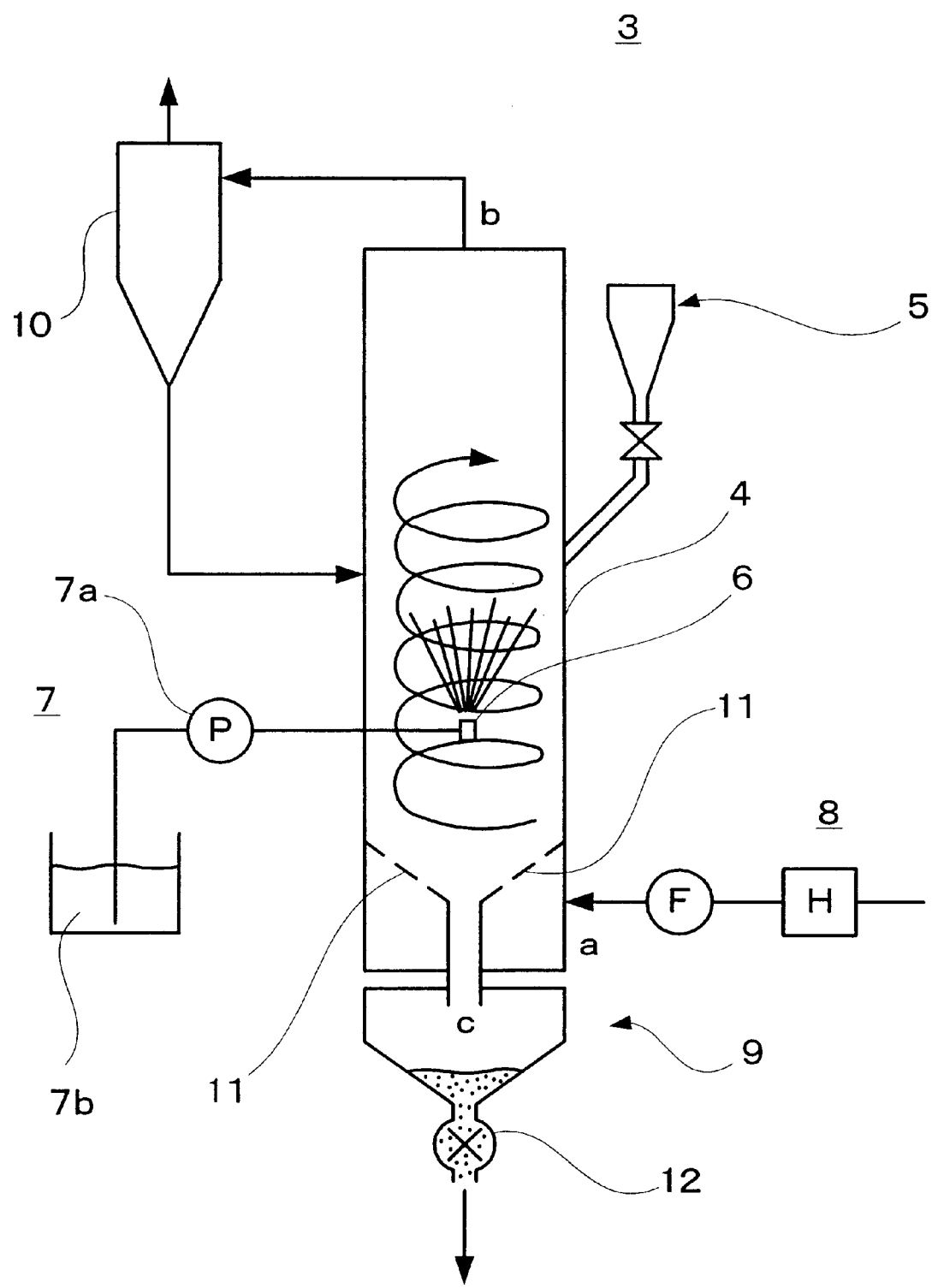
FIG. 3 is a schematic sectional view showing a spray dryer for use in the production of bittern-containing common salt grains.

FIG. 3 is a schematic elementary view showing an embodiment of the spray dryer 3 for use in the production of common salt grains by which an aqueous solution of NaCl or an aqueous solution of NaCl further containing $CaSO_4$ or bittern (hereinafter referred to briefly as coating solution) is sprayed against the surface of a bittern-containing composition optionally containing NaCl (core grains) as provided in the form of solid grains in advance and caused to dry n situso as to give common salt grains each comprised of said core grain and a coating layer comprised of NaCl or a NaCl composition containing $CaSO_4$ or bittern (hereinafter referred collectively as coating composition) as formed on the surface of said core grain.

In the above procedure, the cores comprised of a bittern-containing composition can be prepared using seawater as the raw material. A specific method may either comprise removing NaCl selectively from seawater by means of an ion exchange membrane, concentrating the resulting NaCl-free water by means of a reverse osmosis membrane and evaporating water therefrom by a vacuum evaporation technique, or may comprise concentrating seawater by means of a reverse osmosis membrane, then removing the NaCl fraction selectively by means of an ion exchange membrane, and evaporating water from the resulting NaCl-free concentrate to thereby give a bittern-containing composition in a solid form, preferably solid grains. When said core material contains NaCl as well as bittern, the bittern-containing composition can be provided in a solid form, preferably solid grains by concentrating seawater directly by a reverse osmosis membrane technique or the like and evaporating water by, for example, a vacuum evaporation technique. In this case, the bittern content of the core grain can be reduced or adjusted by washing the grains formed on vacuum or other evaporation of water with water, or an aqueous solution of NaCl.

Though not mandatory, said aqueous solution of NaCl or said aqueous NaCl solution containing $CaSO_4$ or bittern may also be prepared using seawater as the raw material. For example, an aqueous solution of NaCl can be prepared by a method which comprises recovering an aqueous NaCl-containing solution selectively from seawater by utilizing an ion exchange membrane. In this case, seawater may be concentrated by a reverse osmosis membrane technique or an evaporation technique in the first place and then subjected to such an ion exchange treatment or an aqueous solution of NaCl obtained by an ion exchange treatment may be optionally concentrated by a reverse osmosis membrane technique or an evaporation technique. The aqueous NaCl solution containing $CaSO_4$ or bittern may be prepared by adding $CaSO_4$ or bittern to the above aqueous solution of NaCl or alternatively be prepared directly from seawater. The method of preparing a $CaSO_4$-containing aqueous solution of NaCl, for instance, from seawater may comprise recovering an aqueous solution containing $CaSO_4$ and NaCl selectively from seawater by means of an ion exchange membrane. The bittern-containing aqueous NaCl solution can be prepared by direct concentration of seawater by, for example, a reverse osmosis membrane technique but may also be prepared by a method which comprises fractionating seawater into a NaCl-containing fraction and a bittern-containing fraction by an ion exchange technique, optionally concentrating the respective fractions by a reverse osmosis membrane technique or an evaporation technique, and blending them in a ratio giving a smaller proportion of bittern than the proportion of bittern in the bittern-containing composition for constituting the core.

The spray dryer 3 illustrated in FIG. 3 comprises a casing 4 equipped with an air supply port a, an exhaust port b and a discharge port c for withdrawing the bitter-containing common salt grains produced, a feeder 5 for supplying core grains comprised of a bittern-containing composition optionally containing NaCl into said casing 4, a nozzle 6 for spraying an aqueous NaCl solution optionally containing $CaSO_4$ or bittern against the feed core grains, a spray solution supplier 7 for feeding said aqueous NaCl solution to said nozzle 6, an air feeder 8 for supplying drying air into the casing 4, and a discharger 9 for discharging the product bittern-containing common salt grains from the casing 4.

The casing 4 is configured as a vertically elongated cylinder having said exhaust port b communicating with a cyclone 10 at the top thereof. The construction of the cyclone 10 is preferably such that the particles entrained by the air exhausted from the casing 4 may be removed by a filter means and only the air may be discharged. Then, the loss of bittern-containing common salt grains carried away with the exhaust air can be precluded.

Furthermore, the casing 4 has a porous plate 11 in an underside within its cylindrical structure. This porous plate 11 is a plate having a multiplicity of through-holes or a mesh-screen and has a conical oonfiguration tapered off downwardly and toward the center of the cylinder constituting the casing 4, with the center of the cone communicating with the discharger 9 through said discharge port c.

The air feeder 8 is disposed in such a position that it may supply dry air into the casing 4 through said air supply port a from below said porous plate 11. In this arrangement, the feed dry air flows through the holes of the porous plate 11 from below vertically toward the exhaust port b at top of the casing 4. The air to be supplied by the air feeder 8 is not particularly restricted insofar as it is dry air, and may be heated dry air or non-heated dry air. The preferred is heated dry air because it assists in rapid drying. The air feeder 8 is preferably adjusted so that the air may be blown into the casing 4 in a direction substantially perpendicular to the axis of the casing. The air ejected in this direction ascends within the casing 4 while rotating along the inside wall of the hollow cylinder and allows the bittern-containing common salt grains formed within the casing 4 to fall down along the center of the hollow cylinder toward the discharge port c and thence to the discharger 9 communicating therewith.

The nozzle 6 is disposed above the porous plate 11 and below the supply port of the feeder 5 which supplies core grains. This nozzle 6 communicates with said spray solution supplier 7 and is supplied with an aqueous solution of NaCl or an aqueous NaCl solution containing $CaSO_4$ or bittern (said aqueous coating solution) from this spray solution supplier. The spray solution supplier 7 includes a pressure feeder 7a, such as a pump, and a reservoir 7b for the aqueous coating solution to be sprayed, and by means of this pressure feeder 7a the spray solution can be ejected from the nozzle 6 upwardly into the casing 4. The aqueous coating solution is preferably delivered from the nozzle 6 radially in the form of a fine mist and the size of droplets constituting the mist may for example be 1~100 $\mu$m, preferably 5~50 $\mu$m, more preferably 10~30 $\mu$m.

The discharger 9 disposed in communication with the discharge port c of the casting 4 has an underside shape tapered downwardly (in a conical profile) so that the bittern-containing common salt grains falling down through the central orifice of the porous plate 11 and the discharge port c in succession may be accumulated in the apical part of the conical underside. The apical part of the conical underside is open to allow the accumulated bittern-containing common salt grains to be discharged from the apparatus through a rotary feeder 12.

Thus, when the spray dryer 3 shown in FIG. 3 to used, the core grains comprised of said bittern-containing composition as supplied from the feeder 5 and the fine droplets of said coating solution elected from the nozzle 6 are stirred together by the dry air blown up through the porous plate 11 and the stirred droplets of the aqueous coating solution are deposited and dried on the surface of said core grains. The bittern-containing common salt grains gaining in diameter gradually as the coating composition (coating layer) is progressively built up on the surface of the core fall down on the underside of the casing 4 through the space within the cylindrical structure. The bittern-containing common salt grains further travel through the discharge port c formed centrally of the porous plate 11 and fall into the discharger 9, from which the grains are withdrawn through the rotary feeder 12.

The spray dryer described above applies a coating composition in the form of a solution to solid core grains and dries the coating to form a coating layer on the surface of the core grain. As an alternative, the bittern-containing common salt grain of the present invention can be produced by adhering a coating composition in a solid form to the solid core grain with the aid of a binder.

Figure 4:
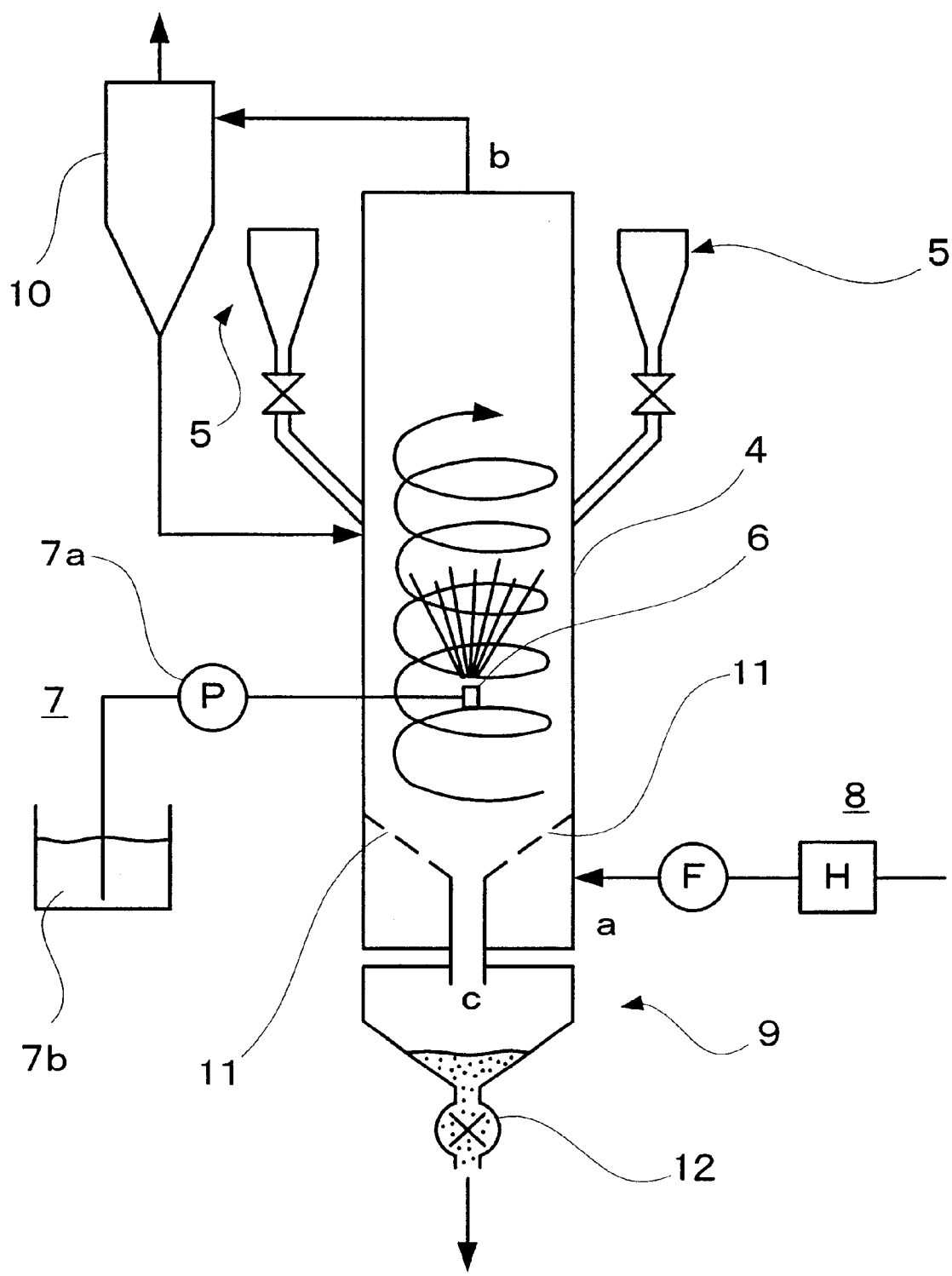
FIG. 4 is a schematic sectional view showing another spray dryer for use in the production of bittern-containing common salt grains.

The spray dryer for this alternative production method is shown in FIG. 4. As illustrated in FIG. 4, this spray dryer 3 is so constituted that both a bittern-containing composition optionally containing NaCl and either NaCl or a NaCl composition containing $CaSO_4$ or bittern are fed each in a solid particulate form to a casing 4 and a binder solution is supplied in a mist form from a nozzle 6. The core grain comprised of the bittern-containing composition optionally containing NaCl and the coating grain comprised of NaCl or a NaCl composition containing $CaSO_4$ or bittern may be fed to the casing 4 from independent feeders 5 as shown in FIG. 4 or may be blended in advance and fed together from a feeder 5.

The binder solution is not particularly restricted but may for example be water or an aqueous solution of NaCl. When the binder is water or an aqueous solution of NaCl, for instance, the surface of the solid core grain is dissolved and the coating grain is caused to adhere to the dissolved surface. It is also possible to use an adhesive agent capable of binding the grains together without dissolving the surface of the core grain or the coating grain.

With the spray dryer shown in FIG. 3 or the spray dryer shown in FIG. 4, bittern-containing common salt grains can be produced continuously.

Figure 5:
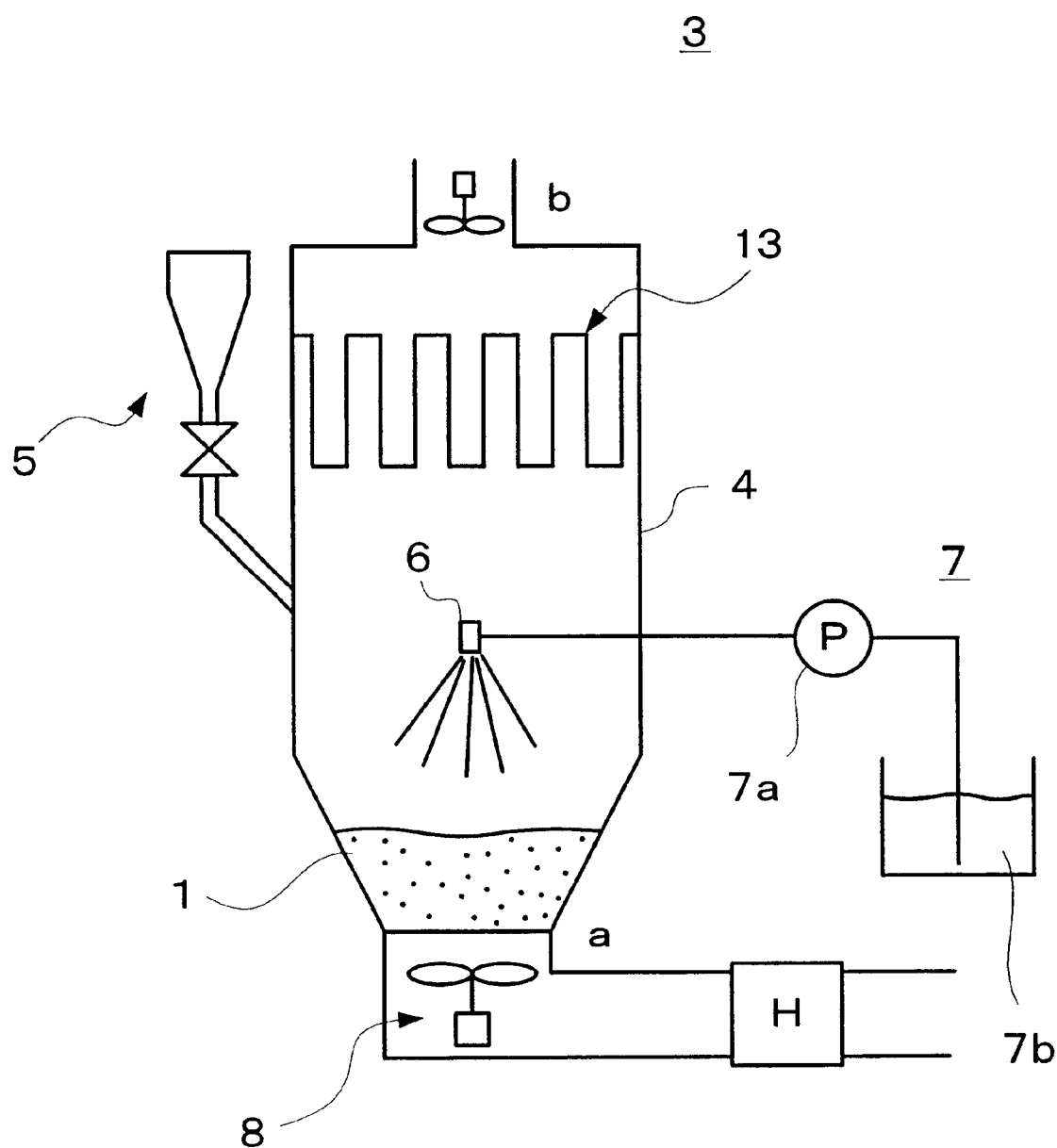
FIG. 5 is a schematic sectional view showing a still another spray dryer for use in the production of bittern-containing common salt grains.

The bittern-containing common salt grains of the present invention can also be produced by using the spray dryer illustrated in FIG. 5. This spray dryer 3 comprises a cylindrical casing 4 equipped with an air supply port a at its bottom, an exhaust port b at its top, and a bag filter 13 in an upper position within its space so that the bittern-containing common salt grains dried by the dry air supplied from the bottom of said casing by an air feeder 8 are collected by said bag filter 13. With this apparatus, core grains 1 comprised of a bittern-containing composition, with which the bottom space of casing 4 is loaded in advance (in this case, the feeder 5 shown in FIG. 5 is not required) or which is supplied by the feeder 5 into the bottom space are sprayed with an aqueous coating solution from a nozzle 6 and dried to coat the surface of each core grain with NaCl or a NaCl-containing composition optionally containing $CaSO_4$ or bittern. Furthermore, a bittern-containing composition optionally containing NaCl for constituting the core grain and either NaCl or a NaCl-containing composition optionally containing $CaSO_4$ or bittern for constituting the coating layer may be fed each in a solid (granular) form into the casing 4 by means of the feeder 5 and a binder be sprayed from the nozzle 6 against the feed grains to form a coating layer consisting of the coating grains on the surface of the core grain.

With this apparatus in which the product bittern-containing common salt grains are trapped and recovered by the bag filter 13, the entrainment of the bittern-containing common salt grains to outside with the exhaust air does not occur so that the objective bittern-containing common salt grains can be obtained in a high recovery yield.

In the above apparatuses Illustrated in FIGS. 3~5, a bittern-containing composition for constituting the core is invariably supplied in a solid form into the casing.

The bittern-containing common salt grains according to the present Invention can also be produced, without prior molding of the bittern-containing composition optionally containing NaCl for constituting the core grain into a solid form, by a spray drying technique which comprises supplying a spray dryer with the bittern-containing composition in the form of a solution, as well as the coating composition.

Figure 6:
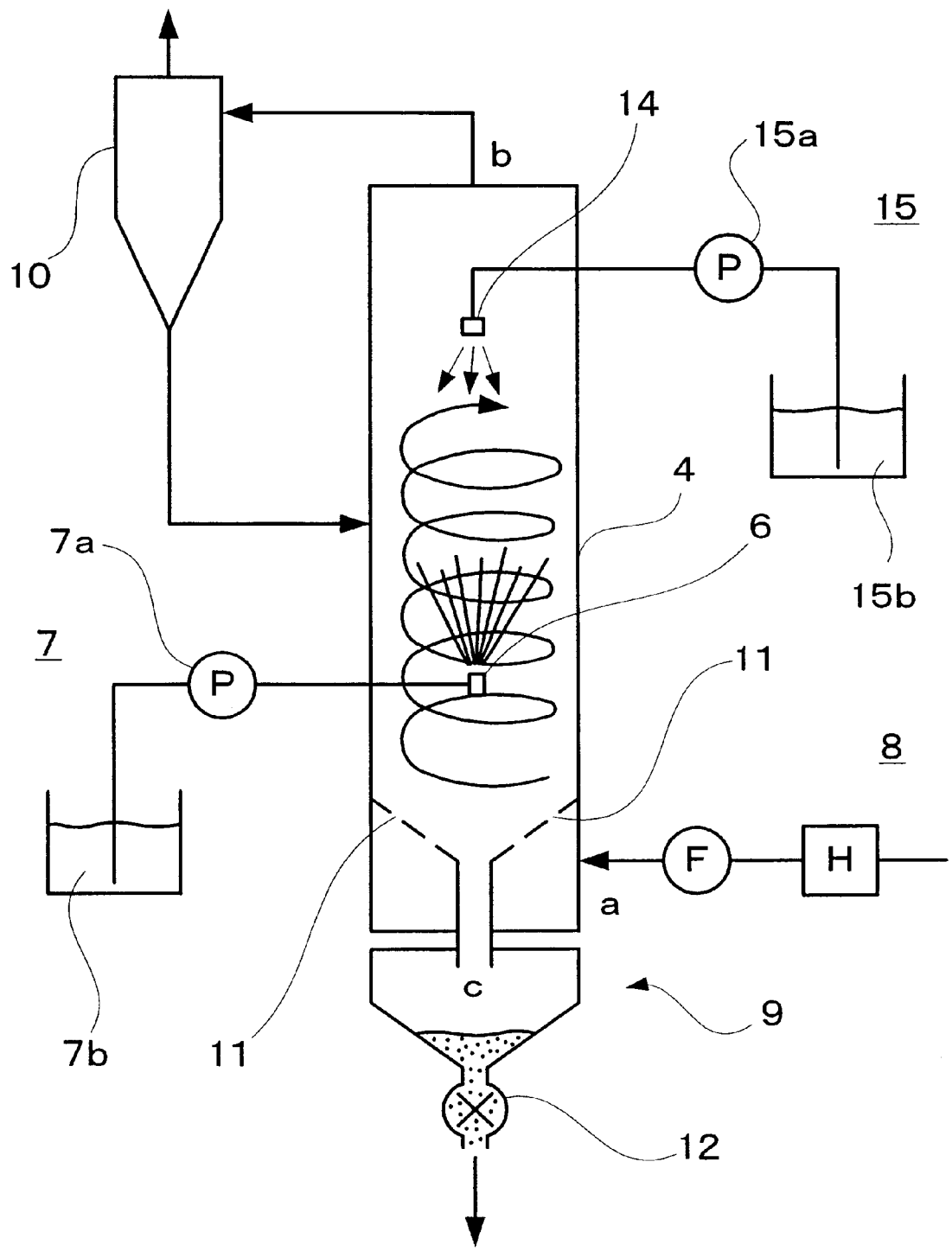
FIG. 6 is a schematic sectional view showing another yet spray dryer for use in the production of bittern-containing common salt grains.

The spray dryer for reducing this method to practice to illustrated in FIG. 6.

The spray dryer 3 shown in FIG. 6 is similar to the spray dryer described above with reference to FIG. 3 except that in lieu of the feeder 5, it comprises a nozzle 14 adapted to eject downwardly an aqueous solution of said bittern-containing composition optionally containing NaCl for constituting the core grain and a spray solution supplier 15 which feeds said aqueous bittern-containing composition solution to said nozzle. The spray solution supplier 15 essentially has a pressure feeder 15a, such as a pump, and a reservoir 15b which stores a spray solution (an aqueous solution of the bittern-containing composition) and adapted to supply the same aqueous bittern-containing composition solution to said nozzle 14. The nozzle 14, like the feeder 5 illustrated in FIG. 3, is disposed in an upper position within the casing 4 and over the nozzle 6 which ejects the aqueous coating solution upwardly.

The aqueous solution of said bittern-containing composition optionally containing NaCl for use with this apparatus may be seawater as such or can be prepared using seawater as the raw material. In the latter case, the aqueous bittern-containing composition solution can be prepared by the method in which seawater is concentrated by a reverse osmosis membrane technique or an evaporation technique, the method which comprises removing NaCl selectively from seawater by means of an ion exchange membrane and optionally further concentrating the resulting NaCl-free water by a reverse osmosis membrane technique or an evaporation method, or the method which comprises concentrating seawater by a reverse osmosis membrane technique or an evaporation technique and then removing NaCl selectively by means of an ion exchange membrane.

When this spray dryer 3 is used, the aqueous bittern-containing composition solution ejected downwardly from the nozzle 14 falls down within the casing 4 and is dried in the course to form solid core grains. Meanwhile, the mist particles of the aqueous coating solution ejected upwardly from the nozzle 6 disposed in a lower position within the casing 4 is deposited on the surface of said core grains and dried under agitation by the dry air introduced from below to provide the bittern-containing common salt grains of the present invention. The bittern-containing common salt grains thus produced travel down through the discharge port a in the center of the porous plate 11 of casing 4, become pooled in the discharger 9, and are fed out of the apparatus through the rotary feeder 12.

Since, with this spray dryer, both the bittern-containing composition optionally containing NaCl for constituting the core grain and the coating composition for constituting the coating layer can be fed each in the form of a solution to the casing from nozzles, the labor and time required for providing these compositions as solid preparations in advance can be dispensed with and the bittern-containing common salt grains of the invention can be produced efficiently and continuously.

(3) Method for Fractional Recovery of Freshwater, a NaCl-containing Composition and a Bittern-containing Composition from Seawater This invention relates to a method by which freshwater, a NaCl-containing composition and a bittern-containing composition can be fractionally recovered from seawater.

The fractional recovery method of this invention can be carried into practice by subjecting seawater to a filtration (membrane) treatment such as reverse osmosis membrane treatment or ion exchange membrane treatment. More particularly, one mode of practicing the method of the invention comprises fractionating seawater into freshwater and a salt-containing water by a reverse osmosis membrane treatment and then fractionating the salt-containing water into a NaCl-containing composition and a bittern-containing composition by an ion exchange treatment. The NaCl-containing composition or bittern-containing solution obtained in the above step can be further subjected to a reverse osmosis membrane treatment to recover freshwater and a residual concentrate. In another mode, the method comprises fractionating seawater into an aqueous NaCl-containing solution and an aqueous bittern-containing solution by an ion exchange treatment and then fractionating each of the resulting aqueous NaCl-containing solution and aqueous bittern-containing solution into freshwater and a NaCl-containing composition or a bittern-containing composition by a reverse osmosis membrane treatment.

The seawater for use as the raw material is not particularly restricted but may be any of surface water, intermediate water, deep water and ultradeep water. It is preferable that the seawater be passed through a filter or filtration membrane to remove sand and foreign matter prior to said reverse osmosis membrane treatment and ion exchange treatment.

The ion exchange treatment can be carried out by using the conventional ion exchange resin or ion exchange membrane capable of selectively separating the NaCl component from seawater and, inasmuch as this separation can be done, there is no limitation at all on the kind of ion exchange resin or ion exchange membrane that can be used. Since the ion exchange treatment is capable of mass treatment in a short time, it Is preferably carried out using a electrodialyzer equipped with an ion exchange resin having the above capabilities.

The reverse osmosis membrane for use in the practice of this invention needs only be capable of fractional filtration of freshwater and a water containing NaCl and bittern from seawater and, in as much as such fractionation can be accomplished, a membrane made of any arbitrary material can be employed regardless of whether it is a natural material, a synthetic material or a semi-synthetic material. For example, the membrane material may be cellulose, cellulose diacetate or triacetate, polyamide, polysulfone, polystyrene, polyimide, polyacrylonitrile or the like.

The system (fractional recovery apparatus) for practicing the fractional recovery method of this invention is schematically illustrated in FIG. 7. This fractional recovery apparatus 16 comprises at least a seawater tank 17 for accepting and storing seawater, a filter 18, a reverse osmosis membrane module 19, an ion exchange module 20, a freshwater recovery section 21, a NaCl-containing composition recovery section 22 and a bittern-containing composition recovery section 23, which are interconnected by pipelines 24.

In this fractional recovery apparatus 16, the reverse osmosis membrane module 19 may be disposed in two locations, namely downstreams of the filter 18 and downstreams of the ion exchange module, as illustrated but may be disposed in only one of the locations.

In this fractional recovery apparatus 16, the seawater in the seawater tank 17 is fed to the filter 18 on actuation of a circulating pump (not shown), whereby the sand and other solid foreign matter are removed from the seawater. The resulting filtrate is fed to the reverse osmosis membrane module 19 or the ion exchange module 20. When it is fed to the reverse osmosis membrane module 19, the seawater is fractionated into freshwater and a salt-containing water, and the freshwater is recovered into the freshwater recovery section 21 through the pipeline 24, while the salt-containing water is fed to the ion exchange module 20.

The seawater or the concentrated salt-containing water, which is fed to the ion exchange module 20 for an ion exchange treatment, is fractionated into an aqueous NaCl-containing solution (composition) and an aqueous bittern-containing solution (composition) which are thence recovered into said NaCl-containing composition recovery section 22 and bittern-containing composition recovery section 23, respectively, through pipelines 24. The NaCl-containing composition or bittern-containing composition thus recovered in the recovery section 22 or 23 can be fed, if necessary, to the reverse osmosis membrane module 19', to give a more highly concentrated NaCl-containing composition or bittern-containing composition. Furthermore, the freshwater produced in this process is recovered in the freshwater recovery section 21 through pipeline 24.

In this manner, the freshwater separated from seawater can be recovered and stored in the freshwater recovery section 21, the NaCl contained in seawater or a NaCl-containing composition rich in NaCl can be recovered and stored in the NaCl-containing composition recovery section 22, and the bittern-containing composition rich in bittern can be recovered and stored in the bittern-containing recovery section 23. The freshwater mentioned above can be used as industrial water, water for daily living or cleaning water and even as drinking water after sterilization. Moreover, the NaCl-containing composition can be used as the raw material for common salt, pharmaceutical or industrial NaCl, and the bittern-containing composition can be used as the raw material of bittern which finds application as a food additive or in performance foods, pharmaceuticals and cosmetic products.

Furthermore, the NaCl-containing composition and bittern-containing composition obtainable by the fractional recovery method described above can be effectively utilized as raw materials for the bittern-containing common salt grains according to the invention. Thus, the bittern-containing common salt grains of the invention can be produced by using said NaCl-containing composition as the coating composition (coating layer) and said bittern-containing composition as the core composition (core grains). Specifically, for example, the NaCl-containing composition obtained by the above production method can be used as the coating solution in the form of an aqueous solution or as the coating grains in the form of a solid after evaporation of water, for example by vacuum evaporation, in the production of the bittern-containing common salt grains of the present invention. On the other hand, the bittern-containing composition can be used as an aqueous solution for constituting the core grain in the form of liquid or as the core grains in the form of a solid after evaporation of water, for example by vacuum evaporation, in the production of the bittern-containing common salt grains according to the present invention.

The bittern-containing common salt grain of the present invention not only has a unique savory, salty taste owing to its bittern component but is characterized in that because of the reduced bittern content of its surface exposed to the atmospheric air, the tendency toward deliquescence and coagulation has been significantly inhibited and, hence, its shelf-life and ease of handling have been improved. Particularly the bittern-containing common salt grain obtainable by the spray drying technique Is spherical or approximately spherical with a reduced intergrain contact area which insures a free-flowing characteristic with a low tendency toward coagulation. Furthermore, the bittern-containing common salt grain of the invention can be provided in a balanced formulation of seawater minerals so that it is a common salt not only having a rounded-off pleasing taste but being kind to human health.

In addition, the method of producing bittern-containing common salt grains according to the present invention is capable of giving common salt grains having the above characteristics with high efficiency. Particularly in accordance with the method specifically claimed in claim 5 or 6, the coating composition can be effectively deposited on the core grain without enlisting the help of a binder so that the bittern-containing common salt grain not containing unwanted ingredients other than bittern and NaCl can be efficiently produced. This means that, by this method of the invention, common salt grains with a good balance of seawater minerals can be produced from seawater.

Furthermore, the present invention provides a method of producing said bittern-containing common salt grains which comprises fractionally recovering freshwater, a bittern component and a NaCl component from seawater and using these bittern and NaCl components as starting materials for said common salt grains. According to this method, common salt grains fully exploiting seawater minerals and hence having a savory taste and a health-contributory feature can be produced. In addition, since the method enables complete utilization of seawater components without emission of waste water, there is no risk for environmental pollution or deleterious influences on ocean ecology. Therefore, the present invention may be categorized as a method for effective utilization of seawater.

EXAMPLES

The following examples illustrate the present invention in further detail and are by no means defining the scope of the invention.

Example 1

(1) In accordance with the system illustrated in FIG. 7, a NaCl-containing composition and a bittern-containing composition are recovered from 20 L of seawater. Thus, 20 L of seawater is filtered through a membrane filter to remove sand and other solid matter and the resulting filtrate is fed to a filtration device (SO-252-2NN, Water Treatment Ace Co., Ltd., Japan) equipped with a reverse osmosis membrane to fractionate it into freshwater and a concentrated salt-containing water. The freshwater is stored in the freshwater recovery section, while 12 L of the salt-containing water is fed to an electrodializer (AC Lyzer G-4, Asahi Kasei, Japan) equipped with an ion exchange membrane (cartridge) rejecting NaCl selectively to fractionate it into a NaCl-containing fraction and a remaining (bittern-containing) fraction.

Using the NaCl-containing fraction obtained above as an aqueous coating solution and the bittern-containing fraction as an aqueous bittern-containing composition solution constituting the core grains, bittern-containing common salt grains are produced by means of the spray dryer shown in FIG. 6. More particularly, with the NaCl-containing fraction is placed in the reservoir 7b of the spray solution supplier and the bittern-containing fraction in the reservoir 15b of the spray solution supplier, the spray dryer is started. Thereupon, the aqueous bittern-containing composition solution ejected radically and downwardly from the nozzle 14 fall down within the casing 4 and is dried to form solid core grains and fine particles of the aqueous coating solution ejected upwardly from the nozzle 6 are deposited on the surface of said core grains and dried under agitation by the dry air supplied from the lower part of the casing 4. The resulting bittern-containing common salt grains amounting to 600 g travel down through the central orifice of the porous plate 11 in the casing 4 and accumulated in the discharger 9.

(2) The common salt grains thus obtained were investigated for ① the relative amounts of sodium chloride, magnesium chloride, magnesium sulfate, calcium sulfate and potassium chloride, ② taste, and ③ tendency toward deliquescence.

① Composition Analysis

The relative amounts mentioned above were investigated by the salt test method (effective Apr. 1, 1997) of the Salt Enterprise Center, Inc. The results are presented in Table 2.

TABLE 2

| | |
|---|---|
| Sodium chloride | 82.17% |
| Magnesium chloride | 8.82% |
| Magnesium sulfate | 4.92% |
| Calcium sulfate | 3.84% |
| Potassium chloride | 0.25% |

② Taste

A panel of 10 tasters was instructed to compare the taste of the bittern-containing common salt grains of the invention with that of refined common salt (NaCl≧99.5%). As a result, the bittern-containing common salt grains of the invention were found to have a significantly more mellow, pleasing salty taste without the pungency of salt.

③ Tendency Toward Deliquescence

The common salt preparation obtained by direct spray-drying of seawater and the bittern-containing common salt grains of the invention were respectively allowed to stand under constant-temperature, constant humidity conditions (temperature 25° C., 75% RH) and changes in appearance were monitored. As a result, whereas the spray-dried seawater preparation began to dissolve within 1 week to assume a sticky consistency, the bittern-containing common salt grains of the invention showed no change, retaining the free-flowing granular characteristic, even after 2 months.

What is claimed is:

1. A method of producing a bittern-containing granular common salt in which each grain thereof comprises a core composed of a bittern-containing composition optionally containing sodium chloride and in which the surface of said core is covered with a coating layer composed of a sodium chloride-containing composition optionally containing calcium sulfate, the method comprising the steps of spraying the surface of said core composed of a bittern-containing composition optionally containing sodium chloride with an aqueous solution of sodium chloride optionally containing calcium sulfate and drying the same to coat said core with a sodium chloride-containing composition optionally containing calcium sulfate.

2. A method of producing a bittern-containing granular common salt in which each grain thereof comprises a core composed of a bittern-containing composition optionally containing sodium chloride and in which the surface of said core is covered with a coating layer composed of a composition containing bittern and sodium chloride, wherein the proportion of the bittern in said coating layer is smaller than that of the bittern in the bittern-containing composition contained in the core, the method comprising the steps of spraying the surface of said core composed of a bittern-containing composition optionally containing sodium chloride with an aqueous solution of sodium chloride containing bittern in a proportion smaller than that of the bittern contained in said core and drying the same to coat said core with a composition containing both bittern and sodium chloride.

3. A method of producing a bittern-containing granular common salt in which each grain thereof comprises a core composed of a bittern-containing composition optionally containing sodium chloride and in which the surface of said core is covered with a coating layer composed of a sodium chloride-containing composition optionally containing calcium sulfate, the method comprising the steps of feeding core grains composed of a bittern-containing composition optionally containing sodium chloride and coating grains composed of a sodium chloride-containing composition optionally containing calcium sulfate to a spray dryer and spraying those grains with a binder to deposit said coating grains on the surface of each of said core grains to form a coating layer.

4. A method of producing a bittern-containing granular common salt in which each grain comprises a core composed of a bittern-containing composition optionally containing sodium chloride and in which the surface of said core is covered with a coating layer composed of a composition containing bittern and sodium chloride, where the proportion of the bittern in said coating layer is smaller than that of the bittern in the bittern-containing composition contained in the core, the method comprising the steps of feeding core grains composed of a bittern-containing composition optionally containing sodium chloride and coating grains composed of a composition containing sodium chloride and bittern, wherein the bittern content is lower than the bittern content of said core grain, to a spray dryer and spraying those grains with a binder to deposit the coating grains on the surface of each of said core grain to form a coating layer.

5. A method of producing a bittern-containing granular common salt according to claim 1 or 2 further characterized in that bittern-containing common salt grains are produced by a spray drying technique using a seawater-derived sodium chloride-containing composition and bittern-containing composition as the sodium chloride-containing composition optionally containing calcium sulfate or bittern and the bittern-containing composition optionally containing sodium chloride, respectively, these compositions being obtainable by the following step (a) or step (b):

(a) subjecting seawater to a reverse osmosis membrane treatment to fractionate it into freshwater and a salt-containing water and subjecting the salt-containing water to an ion exchange treatment to fractionate it into a sodium chloride-containing composition and a bittern-containing composition; or (b) subjecting seawater to an ion exchange treatment to fractionate it into an aqueous sodium chloride-containing solution and an aqueous bittern-containing solution and subjecting each of the aqueous sodium chloride-containing solution and aqueous bittern-containing solution to a reverse osmosis membrane treatment to fractionate them into freshwater and a sodium chloride-containing composition or a bittern-containing composition.

6. The method of producing a bittern-containing granular common salt according to any of claims 1, 2, 3, and 4, wherein the bittern-containing composition contains at least magnesium chloride, magnesium sulfate, potassium chloride, and calcium sulfate.

* * * * *